(12) United States Patent
Prosser et al.

(10) Patent No.: US 9,893,526 B2
(45) Date of Patent: Feb. 13, 2018

(54) NETWORKED POWER MANAGEMENT AND DEMAND RESPONSE

(75) Inventors: Ronald D Prosser, Huntington Beach, CA (US); Victor Shao, Mountain View, CA (US)

(73) Assignee: Green Charge Networks LLC, Santa Clara, CA (US)

( * ) Notice: Subject to any disclaimer, the term of this patent is extended or adjusted under 35 U.S.C. 154(b) by 662 days.

(21) Appl. No.: 13/423,958

(22) Filed: Mar. 19, 2012

(65) Prior Publication Data

US 2012/0245744 A1 Sep. 27, 2012

Related U.S. Application Data

(60) Provisional application No. 61/467,908, filed on Mar. 25, 2011, provisional application No. 61/467,929, filed on Mar. 25, 2011, provisional application No. 61/508,012, filed on Jul. 14, 2011.

(51) Int. Cl.
*G05F 5/00* (2006.01)
*H02J 3/32* (2006.01)
*H02J 3/46* (2006.01)

(52) U.S. Cl.
CPC . *H02J 3/32* (2013.01); *H02J 3/46* (2013.01)

(58) Field of Classification Search
CPC ..................................... H02J 3/32; H02J 3/46
USPC ......................................................... 700/286
See application file for complete search history.

(56) References Cited

U.S. PATENT DOCUMENTS

| | | | | |
|---|---|---|---|---|
| 5,644,173 A * | 7/1997 | Elliason | .................... | H02J 3/14 307/29 |
| 5,703,442 A | 12/1997 | Notohamiprodjo | | |
| 6,037,758 A | 3/2000 | Perez | | |
| 6,134,124 A | 10/2000 | Jungreis | | |
| 6,542,791 B1 | 4/2003 | Perez | | |
| 6,671,586 B2 | 12/2003 | Davis | | |
| 6,868,293 B1 * | 3/2005 | Schurr | ............... | G05D 23/1905 323/211 |
| 6,882,904 B1 * | 4/2005 | Petrie | ........................ | H02J 3/28 700/286 |
| 6,889,122 B2 | 5/2005 | Perez | | |
| 6,900,556 B2 | 5/2005 | Provanzana | | |
| 6,902,837 B2 | 6/2005 | McCluskey | | |
| 7,060,379 B2 | 6/2006 | Speranza | | |
| 7,778,738 B2 | 10/2010 | Taft | | |

(Continued)

*Primary Examiner* — Carlos Ortiz Rodriguez
(74) *Attorney, Agent, or Firm* — Richard C. Galati; Holland & Hart LLP

(57) ABSTRACT

Systems of networking power management systems are disclosed, wherein the systems receive control parameters from a control terminal and bring about demand response, curtailment, and other load management actions. One control terminal may be used to control many zones in different ways, and the load management actions may be automated to improve efficiency and predictability of the results of demand response actions. Some of the systems may be mobile and connectable to different sites in the network to respond to changing needs in the utility distribution grid. Large demand response requirements may be distributed among multiple sites or systems in order to encourage and enable participation in demand response programs by customers that would not traditionally be able to do so because of not being able to produce sufficient demand response results individually.

23 Claims, 9 Drawing Sheets

(56) References Cited

U.S. PATENT DOCUMENTS

| | | |
|---|---|---|
| 2001/0043013 A1 | 11/2001 | Abe |
| 2004/0084965 A1 | 5/2004 | Welches |
| 2008/0183337 A1 | 7/2008 | Szabados |
| 2008/0191675 A1 | 8/2008 | Besser |
| 2008/0272934 A1* | 11/2008 | Wang et al. ............. 340/870.11 |
| 2010/0114389 A1* | 5/2010 | Chatterton et al. ........... 700/291 |
| 2010/0253244 A1 | 10/2010 | Snook |
| 2010/0262296 A1* | 10/2010 | Davis et al. ................. 700/275 |
| 2010/0274602 A1 | 10/2010 | Kaufman |
| 2010/0301771 A1* | 12/2010 | Chemel et al. .............. 315/294 |
| 2010/0301773 A1* | 12/2010 | Chemel et al. .............. 315/297 |
| 2010/0327800 A1 | 12/2010 | Reineccius |
| 2011/0004358 A1 | 1/2011 | Pollack |
| 2011/0035061 A1 | 2/2011 | Altonen |
| 2011/0046806 A1* | 2/2011 | Nagel et al. ................. 700/291 |
| 2011/0166710 A1* | 7/2011 | Kordik et al. ................ 700/277 |
| 2011/0204720 A1* | 8/2011 | Ruiz et al. ..................... 307/66 |
| 2011/0231320 A1 | 9/2011 | Irving |

* cited by examiner

NETWORKED POWER MANAGEMENT AND DEMAND RESPONSE

CROSS-REFERENCE TO RELATED APPLICATIONS

Priority is claimed to related U.S. Provisional Patent Application Ser. Nos. 61/467,908 and 61/467,929, each filed Mar. 25, 2011, and Ser. No. 61/508,012, filed Jul. 5, 2011, which are hereby each incorporated by reference in their entirety.

BACKGROUND

The present invention relates to the field of electrical utility usage mitigation and optimization, and to the field of distributed energy storage.

Electrical energy generation and distribution had been a mainstay for residential and commercial energy needs for societies all over the world for many years. Various forms of electrical energy generation have existed for some time now, including coal fired power plants, nuclear power plants, hydroelectric plants, wind harness plants, and others. All of these forms of electrical energy generation are well known to those of skill in the art of power generation and details of their operation need not be set forth herein. Many volumes of published literature exist on all of these well-known forms of electrical power generation, from sources all over the world.

As power generation has advanced, power usage has increased. This is due to many societal factors. First, populations in practically every country of the world have increased, resulting in more power needs. Second, consumer products frequently are designed to use electrical energy in order to operate. Due to advances in technology, more electronic products are available for use today than at any time in world history. Third, manufacturing plants have realized that machine automation can increase plant productivity and decrease production costs. Such automation usually requires electrical energy. Thus, the overall result is a greater need for electrical energy than ever before.

Another common occurrence around the world related to energy consumption is that consumption is greater during certain hours of the day. In any given time zone, electrical energy usage is greatest during hours of 6 a.m. and 10 p.m., commonly referred to as the "awake hours" or waking hours. Between 10 p.m. and 6 a.m. the next day, most people are sleeping and therefore are using less electrical energy. These hours are commonly called the "sleeping hours." In order to avoid energy "brownouts" or, worse yet, "blackouts," power companies have to be able to meet "peak demand" requirements of any given 24 hour day. These peak demand requirements occur during the awake hours and historical data obtained from tracking energy usage can fairly accurately predict how much energy will be needed each hour of each day in practically any community. Therefore, peak demand is one of the main drivers of the size and number of power plants needed for any given area. Peak demand drives the sizing and number of feeders, mains, transformers, and other power distribution elements in the grid as well.

The problem with using peak demand requirements to determine power plant capacity is that it does not make for efficient use of the resulting power plant. For example, if a peak demand period in a given area is X kilowatt-hours and that demand is only required for a period of eight hours each day, and the average demand for the rest of the day is half of X, then the design capacity of that power plant for the other sixteen hours of the day is not being effectively utilized. Said another way, if the full energy production capacity of each power plant, for each day, was utilized, fewer power plants would be needed because each one would be fully utilized, all day, every day. Design and usage could then be based on total energy needs each day rather than peak demand needs. Using peak demand requirements also results in an inefficient use of the distribution and transmission systems used by the power plants to deliver the electrical energy they produce.

Another problem with peak demand requirements is the high environmental and financial costs of operating the plants. The power plants that respond to peak demand loads during especially high demand periods of time are frequently more pollutive and expensive to operate than non-peaking power plants. The power companies operating the power plants that wait to supply power for peak demand periods charge a high price to local utilities for their temporary power output. Local utilities then pass the costs of buying power from these peak demand plants to customers as a "demand charge" based on the highest peak draw that the customer takes from the power grid over a billing period. Demand charges are determined differently by various utility providers but tend to be based on the highest usage of electricity (in kW) over a short period of time within a monthly billing cycle. Electricity providers justify these costs by citing the high prices of the peak demand power supply companies and by explaining that they must constantly upgrade and increase capacity of the distribution grid to manage the "spikes" in demand that arise during peak periods.

A consumer's draw on the power grid is, on average, much lower than the power level at which they are rated for demand charges. End users are often unaware of when or how demand charges are accumulated and are displeased to find out that their average electricity consumption is in fact typically much lower than these peaks, and that their power charges would be significantly reduced if their peaks in consumption could be mitigated or eliminated. Environmentally-conscious end users also seek to reduce emissions from the pollutive power plants that provide peaking energy to the grid by decreasing their reliance on them as a power source for peak energy needs.

Furthermore, utility providers have difficulty in estimating and confirming the amount of demand response that results when the providers broadcast a need for demand response participation from enrollees in a demand response program. Requests are traditionally sent out via telephone, and loads at the participants' sites must be manually curtailed by the customer. This can lead to actual participation rates that are much lower than enrollment logs would indicate.

BRIEF SUMMARY OF EMBODIMENTS OF THE INVENTION

In accordance with one embodiment of the present invention, energy consumption is made more level at a site and peaks in power consumption are reduced. For example, at times when the power consumption of a location is less than its average power consumption, energy is stored in an energy storage device, such as, for example, an array of batteries which may be located at or near a structure or a microgrid. The energy stored in the energy storage device comes from the utility grid, or local power generation sources, such as, for example, photovoltaic solar panels. Then, at times when the power consumption of the location exceeds its average power consumption, the stored energy may be supplied to the location to supply all or part of the energy needs of, for example, a given structure connected thereto, thereby reducing or eliminating a peak or spike in consumption at that time. By using the stored energy during peak demand periods, power consumption is distributed over time, and sustained high power consumption periods that would otherwise result in demand charges are leveled to approach or match the average power consumption of the location.

In some embodiments of the present invention, the energy storage may be connected to and placed in or near a business office, factory, home, or other location of energy consumption. In some embodiments, a basement or nearby structure could house the energy storage devices. In some embodiments, the energy storage is connected to smaller scale installations, such as, for example, in vending machines, computer banks, freezers, or other equipment that requires a supply of electrical energy to operate. These smaller installations are most benefited by the present invention when their energy draw (in watts) at peak times is significantly higher than their average power draw over time. In some embodiments the systems are of modular construction to allow for efficient set-up, expansion, and repair. Here, modularity is preferably maintained at both the source and load side of each system.

The present invention may be accomplished by conventional energy distribution equipment being connected to energy storage devices, such as, for example, electrochemical batteries, wherein the batteries may be charged with energy produced at a power plant as often as desired. The power plant that supplied the charging energy to the batteries may be a conventional fossil-fuel burning or nuclear power plant, or may consist of an alternative power source, such as, for example, a solar, wind, or hydroelectric source. The electrical energy supplied by the system may be delivered in direct current form, or may be delivered as single-phase or multi-phase alternating current. Converter/inverter equipment is preferably provided in the system to properly alter the form of the electrical energy provided to, and drawn from, the energy storage.

A localized network of energy storage devices and/or energy generation devices, which devices are connected to loads, which network may be connected or disconnected from a centralized distribution grid is called a microgrid. A power management system may be configured as a microgrid when it has either energy storage or generation devices that are connected to loads and the system may power loads during times of at least temporary disconnection or outage at the utility grid level. A network of these power management systems may also form a microgrid when power may be transmitted between the power management systems and loads across the networked sites to some degree.

In some embodiments of the present invention, load reducing and mitigating devices are integrated into or used in conjunction with the energy storage devices to lessen the amount of power required to be provided by the energy storage devices in cases of structure power loss or degradation, such as, for example, a light-dimming circuit that reduces the power consumed by lighting in a structure while the energy storage device is delivering power to the structure. Other embodiments use or integrate power outlet control circuitry to connect, disconnect, or set limits on the power provided by one or more power outlets in a structure when the energy storage device is delivering backup power to the structure. Alternative embodiments use load reducing devices even when there is no power loss or degradation from the utility distribution grid.

In some embodiments of the invention, multiple power management systems are installed at multiple sites and connected through a network to a controller that manages the multiple systems remotely. In some cases, for example, the controller is operated by an electrical utility provider, and in cases of a demand surge, the utility provider is enabled to use the controller to instruct the multiple systems to discharge electricity from batteries or other energy storage into the distribution grid to reduce demand in the area. In some embodiments, the electrical utility provider may instruct the systems to reduce the consumption of electrical loads at the site, such as would be done in a demand response program. The systems at the sites may communicate with a network controller to make their current demand management availability known. In some embodiments the systems send information to the network controller regarding the result of a demand response request, such as the amount of consumption reduced by the system in response to a demand response request.

In some embodiments of the invention, a method and system of electrically connecting multiple power management systems is provided, wherein the systems can send and receive power from each other to charge and discharge as a whole. For example, a number of systems could be connected normally to a plurality of sites, but with non-utility distribution based power cables running between them so that when one site needs peak mitigation, that site's system can draw on its local energy storage or from other connected energy storage without drawing power from or transferring power to the utility grid. Additionally, if a site is unable to respond to a peak load on its own power, it can access energy from other power management systems to supplement its capacity to mitigate loads.

An inherent benefit of the present invention is the ability to supply power to a location or group of locations when a brownout or blackout occurs. Brownouts and blackouts can occur for a number of reasons including, for example, unusually hot temperatures during the summer, which causes a surge in demand due to heavy use of air conditioning by consumers. The surge in power can overload electrical equipment and the power supplied to an area can be cut off (in the case of a blackout) or be reduced in voltage (in the case of a brownout). Planned blackouts, also called "rolling blackouts", have been imposed in various parts of the world due to loss of key transmission lines because of faulty sensors. While these anomalies are not very common when one considers the total time that energy is delivered to any area, they nevertheless can result in significant problems for end users. Consequently, it should be realized by one skilled in the art that the system of the present invention may typically be collaterally utilized to maintain power supply to an area in the case of brownouts and blackouts.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, wherein.

DETAILED DESCRIPTION

Consumption Management Systems

Figure 1:
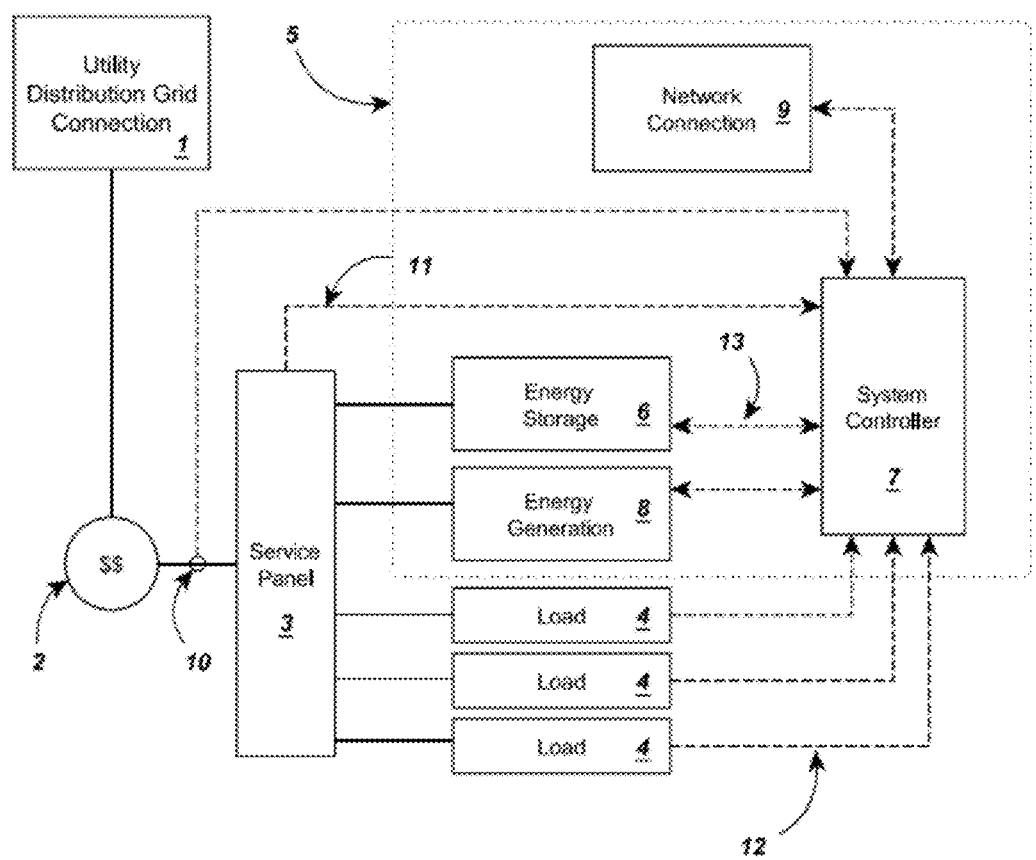
FIG. 1 is a schematic block diagram illustrating components of a load leveling and peak mitigation system.

Networked systems of the invention may be comprised of power management systems and network controllers. Networked systems can be connected to grid sites that have a connection to the utility distribution grid and may form microgrids of networked systems that can exchange energy through means other than the utility's distribution grid network. FIG. 1 shows a schematic block diagram view of components of a power management system connected to a utility distribution grid connection for peak mitigation and load leveling at a site that may be used in such a network. Load mitigation may be completed through offsetting the consumption of a load to an energy source that is not the utility grid, such as an energy storage or generation device, or through discharging such an energy source into the grid or into the electrical systems of the site. Mitigatable loads are those loads capable of being mitigated, such as a lighting system that can be shifted to battery power during a demand response event. A mitigation system is an energy storage system, generation system, or other energy source that is capable of providing mitigation to mitigatable loads.

In FIG. 1, a utility distribution grid connection 1 is connected to a power service meter 2. The grid connection 1 may be, for example, an electric utility power connection from a local transformer disposed on the community electrical grid. The power service meter 2 stores information about the total electricity drawn from the grid connection 1 to the site. In this system, the power service meter 2 is connected to a service panel 3 with a rated power, connections for a plurality of loads 4, and circuit breakers. The grid connection 1, power service meter 2, service panel 3, and loads 4 constitute a standard end-user connection for electrical consumption. This standard connection is modified by the power management system 5 when it is installed at the site. The system 5 is comprised of one or more energy storage devices 6 and a system controller 7. Energy generation devices 8 and network connection 9 features may also be included to suit the end-user's needs.

The system controller 7 measures and monitors the electricity being drawn from the grid connection 1 at a point 10 between the power service meter 2 and the service panel 3, such as, for example, measuring the current passing through that point 10. The system controller 7 also measures electrical properties of the service panel 3 and one or more loads 4 connected to the service panel 3, as indicated by dashed lines 11 and 12. The controller 7 may also take readings 13 from the energy storage 6 and energy generation 8 at the site regarding their electrical properties, such as, for example, the state of charge or voltage in a battery energy storage device or the present power provided by a solar panel energy generation device. The system controller uses these readings 10, 11, 12, and 13 along with any instructions from the network connection 9 to calculate and issue instructions to the storage and generation systems.

In some embodiments, the energy storage 6 and energy generation 8 elements are electrically connected to the service panel 3, and in some embodiments they may be electrically connected directly to each other. In either of these configurations, the energy generation element 8 can provide power to recharge the energy storage 6 through the electrical connection, provided that required inverter/converter electronics are provided to harmonize the electrical signals for charging of the energy storage 6. Diodes and switching means, such as, for example, transistors, may also be used in the electrical connection to prevent stray current or current backflow from damaging components of the system.

In some embodiments, a network connection 9 is linked to the system controller to issue instructions to the controller and to allow a remote user to manage the properties of the system. In another embodiment, the network connection 9 is linked to other power management systems similar to system 5 to coordinate the use of their abilities and to share information such as, for example, environmental conditions, storage system conditions, user needs, and historical loads and activities.

In some cases it may be beneficial to store the power management system 5 on a mobile platform that can be connected and disconnected from the service panel 3, loads, transformers, and other electrical apparatus connected to the utility distribution grid. This way a power management system 5 may be relocated to other sites or to different portions of the same site and may be switched out for power management systems that have different properties such as larger capacity, inverters with greater conversion rates, network capabilities, generators, etc.

Control of Consumption Management Systems

Figure 2:
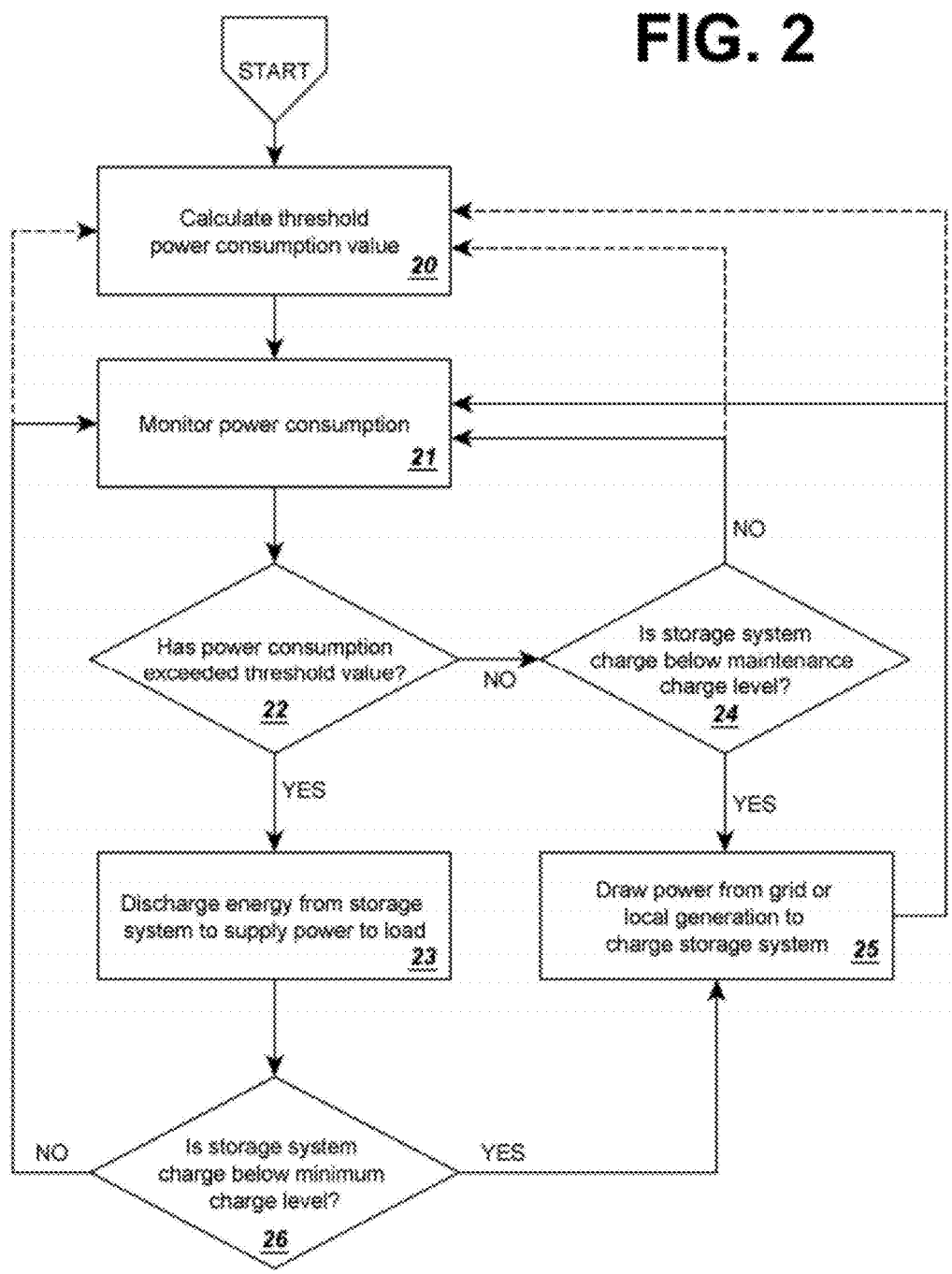
FIG. 2 is a flowchart depicting a system controller process executed by a load leveling and peak mitigation system when preventing consumption from exceeding a maximum value.

The power management systems perform load leveling, peak mitigation, load offsetting, and power supply stability to the grid sites to which they are connected. FIG. 2 is a flowchart depicting a system controller algorithm according to one embodiment of the invention. The controller first calculates a threshold power consumption value at 20 and then begins to monitor power consumption of the loads at the site at 21. As power consumption is monitored, the controller determines whether present power consumption exceeds the threshold value at 22. If it has exceeded that value, the controller instructs the storage system to supply excess energy above the threshold value to the load at 23. If it has not exceeded that value, the controller determines whether the storage system charge has fallen below a maintenance charge level at 24. If it has not fallen below the maintenance charge level, the controller resumes its monitoring function at 21. If it has fallen below that level, the controller directs the storage system to recharge at 25 using power from the distribution grid, local nonrenewable generation, or preferably, local renewable generation until the storage system reaches the maintenance charge level, then the controller resumes its monitoring function at 21.

In some embodiments, the threshold power consumption value is determined by end-user input. For example, the end-user may input a maximum power consumption rate (in kW) that should never be exceeded. In this situation, the system controller 7 monitors the consumption rate and supplements power from the energy storage when an overage is detected. Similarly, in some embodiments the end-user may input a maximum energy storage temperature, a maximum or minimum renewable to nonrenewable energy consumption ratio, time-limiting values for the energy storage and generation to activate, limits based on characteristics of the loads, and other limiting values. In any of these examples, the user input is used to calculate a threshold power consumption value in step 20 by converting the non-power consumption inputs into power consumption units. For example, if a user inputs a maximum temperature for a battery bank of energy storage, the controller would determine the rated maximum rate and length of time for the batteries to charge and discharge, along with local temperature readings on the batteries, and then would keep the batteries from exceeding that temperature by modifying their activity when they are used for peak shaving or backup power supply. In another example, if the user inputs a time limit on the active use of the energy storage to prevent charging and discharging at night, the controller will prevent all activity by the energy storage until the allotted time has passed. In some embodiments, the threshold power consumption value is determined by a network connection to a utility provider. In these embodiments the threshold value is transmitted to the system controller and the controller limits power consumption at the site that is drawn from the utility's distribution grid.

In some embodiments, the threshold power consumption value is calculated by data provided to the system controller 7 from the current measurement 10 and voltage measurement 11. From these measurements the system controller determines power consumption and finds a threshold power consumption value by comparing the present power consumption to a moving average of the power consumption. As used herein, a "moving average" of the power consumption may be calculated as a simple, cumulative, weighted, or exponential moving average, or by a curve fitting method such as, for example, nonlinear or segmented regression, a least squares method, or other statistical analysis. In embodiments of the present invention wherein a feedback loop or data storage technique is used to calculate the present threshold power consumption value, the steps 24 and 25 may be preferably directed toward step 20 instead of step 21 to allow the controller to use up-to-date power consumption data in step 20, as shown by dashed lines in FIG. 2. Alternatively, the process of FIG. 2 may be restarted to allow the controller to calculate an updated threshold power consumption value.

In some other embodiments, the threshold power consumption value is determined using historical data from the site at which the power management system is installed or when other power demand information is known. Here, the system anticipates loads in advance and adjusts the threshold power consumption value near the times those loads are anticipated to occur in order to ensure that there is enough energy available in the system to prevent exhaustion of the energy storage during mitigation of the peaks in consumption caused by those loads. This historical data or predicted load data can be used in conjunction with readings of the instantaneous loads at the site to optimize the efficacy of the calculation of the threshold power consumption value. This data may also be transmitted to other connected energy management systems or to a central network operations terminal, such as for optimization of energy usage over a network.

In some embodiments, the maintenance charge level is determined by user input. For example, the user in this case may determine battery properties including discharge profiles and set the maintenance charge level to prevent undesired changes to the energy storage that can result from overcharging. In another embodiment, the maintenance charge level varies according to the properties of the storage system, the loads, and other electrical properties of the site, and the system controller adjusts the maintenance charge level appropriately to preserve storage functionality over time.

In some embodiments, a step 26 is performed wherein the controller determines whether the charge of the energy storage has fallen below a minimum charge level. If the minimum charge level is breached, the storage system is recharged with power from the grid or from local generation in step 25. If minimum charge is preserved, the controller resumes monitoring power consumption 21.

In some embodiments, the minimum charge level is determined by user input. Typically, the user in this case determines battery properties including discharge profiles and sets the maintenance charge level to prevent undesired changes to the energy storage that can result from deep discharging and recharging. In some embodiments, the system controller calculates a minimum charge level to reserve charge for emergency peak mitigation or unpredictable demand fluctuations. The maintenance charge level may alternatively be set by an electrical power utility provider to enable it to call on the storage system for demand reduction in a community via a network connection. Those of skill in the art of battery management systems will find other reasons for supporting a minimum charge level apparent from use of batteries in these embodiments.

Figure 3:
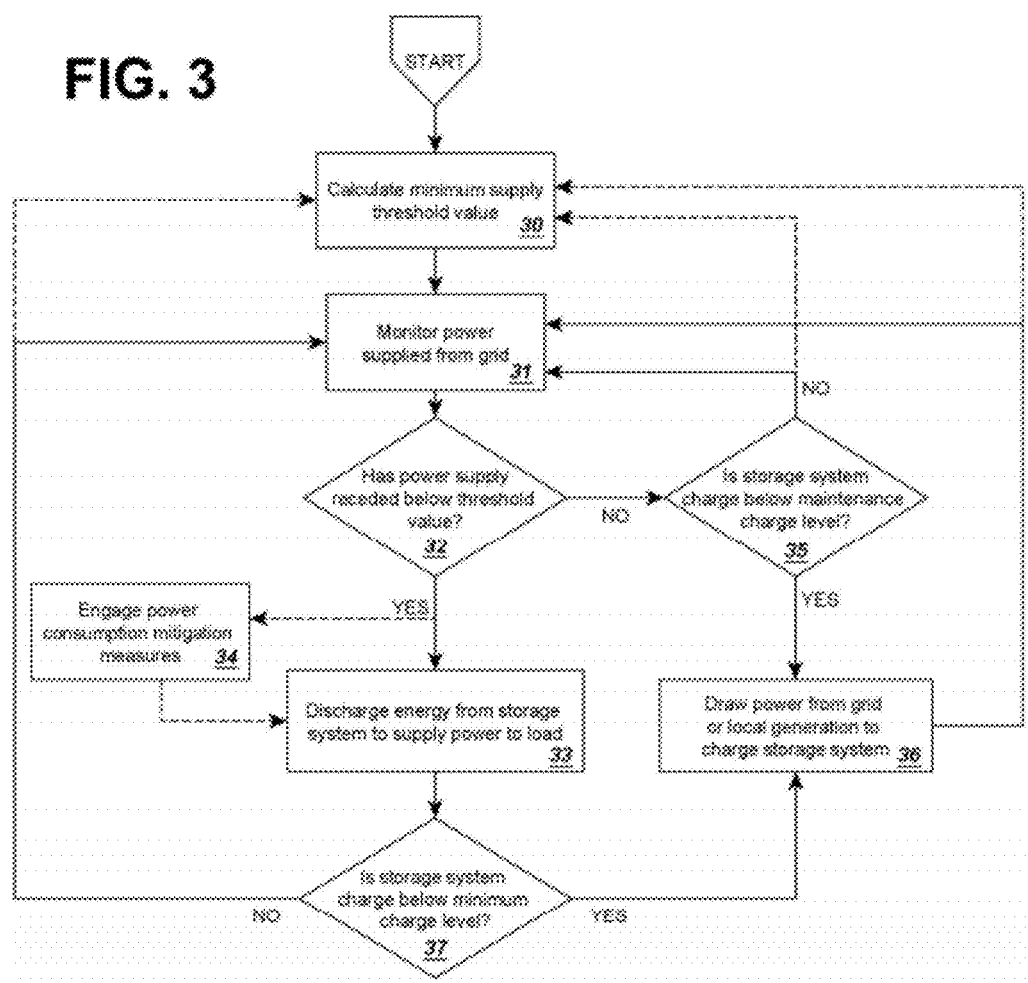
FIG. 3 is a flowchart depicting a system controller process executed by a load leveling and peak mitigation system when power supplied to a system recedes below a threshold value.

FIG. 3 is a flowchart depicting a system controller algorithm for providing power supply stability and load offsetting with a power management system. The controller first calculates a minimum supply threshold value 30 and then begins to monitor power supplied from the grid 31. As power supply levels are monitored, the controller determines whether the power supply has receded below the minimum supply threshold value 32. If it has receded below that value, the controller directs the storage system to supply power to the load 33 and it determines again whether the power supply has receded below the threshold value 32. If the power supply has not receded below the threshold value in 32, the controller determines whether the storage system charge is below a maintenance charge level 35. If it is not, it continues monitoring power supplied from the grid without charging the storage system 31. If the storage system charge is below the maintenance charge level in step 35, the controller directs the system to draw power from the grid, local nonrenewable generation, or preferably local renewable generation 36 to charge the storage system until its charge level is no longer below the maintenance charge level and then resumes monitoring power supplied from the grid 31. In another embodiment of the invention, after energy is discharged from the storage system in step 33, the controller determines whether the charge of the storage system is below a minimum charge level 37 and either proceeds to step 36 or returns to step 31. In some embodiments, particularly when the minimum supply threshold value varies, a feedback loop to calculate the minimum supply threshold value is created, as indicated by the dashed lines leading into step 30.

In additional embodiments of the algorithm of FIG. 3, the system controller may optionally engage power consumption mitigation measures 34, if available, and then discharges energy in step 33, as indicated by the dashed lines. In these embodiments, the power consumption mitigation measures include means for reducing power consumption of the structure, such as, for example, activating low-wattage lighting and deactivating high-wattage lighting in the structure, dimming the power provided to other loads at the site, or deactivating noncritical power outlets or other nonessential electrical elements of the site. In this manner, the discharge of the storage system in step 33 is lengthened. In other embodiments, the power consumption mitigation measures of step 34 include local renewable and nonrenewable energy generation systems. In these cases, the generators are connected to charge the energy storage, or supply power to the loads or service panel to extend the time that the energy storage can support power at the site in step 33 while the power supply is below the threshold value.

In some embodiments, the minimum supply threshold value is set as the value under which critical loads at the site will be detrimentally affected. For example, an end user may select the minimum supply threshold value to be zero watts to activate this algorithm when a blackout occurs, or the user may select two kilowatts as the value in order to activate this algorithm to protect data loss from a computer network that requires two kilowatts to operate.

In some embodiments, the algorithms provided by way of example in FIG. 2 and FIG. 3 may be practiced simultaneously or individually by the controller. In this manner, the controller monitors a plurality of readings and takes action if one or more of the conditions of FIG. 2 or FIG. 3 are met.

Networking Management Systems

Figure 4:
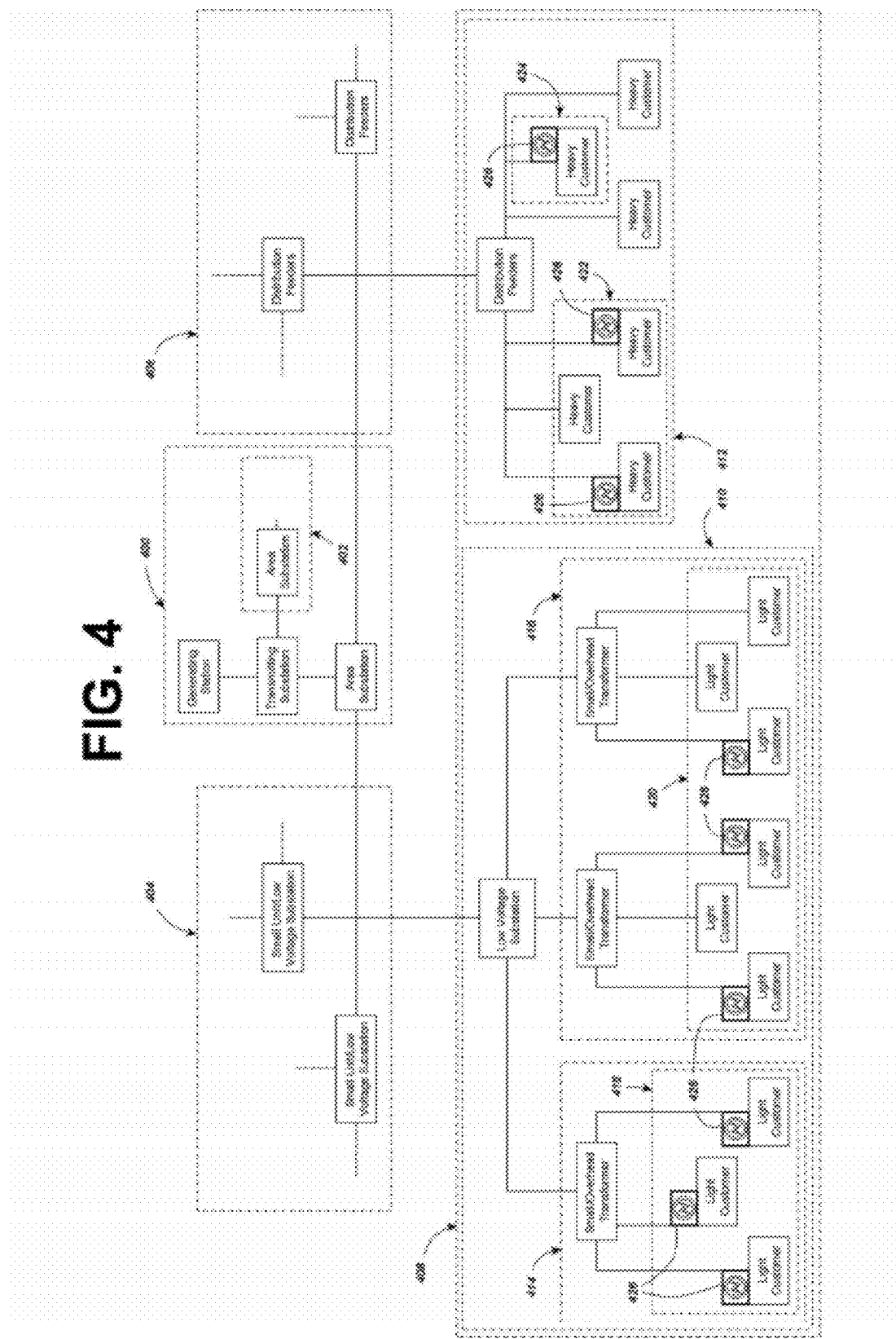
FIG. 4 is a diagram of a distribution grid with power management systems installed by some customers.

FIG. 4 is a diagram of an electrical utility distribution grid with power management systems and/or microgrids placed in various zones. Exemplary zones may range in scope from the level of a transmitting substation and/or group of area substations (e.g., zone 400) to an area substation (e.g., zone 402) to groups of low voltage substations and/or distribution feeders (e.g., zone 404, 406, and 408) to single low-voltage substations or distribution feeders (e.g., zone 410 or 412) to small/overhead transformers, or groups thereof, (e.g., zone 414 or 416) to groups of customers (e.g., zone 418, zone 420—which groups customers across multiple transformers, or zone 422) to individual customer sites (e.g., zone 424). Power management systems 426 may be installed at every customer's site in the zone, as in zone 418, or may be installed for a portion of the customers in the zone, as in zone 422. Broader zones that include generating stations or multiple regions having generating stations may also have power management systems 426 installed, and sub-portions of customer sites may have power management systems 426 installed, depending on the capabilities and distribution of the systems 426 and the needs of the power user or utility operator. Some zones contain multiple sub-zones, such as zone 408. A control terminal may be used to send control or demand response parameters to power management systems across multiple zones or sub-zones. These parameters may differ from one zone or sub-zone to another.

Figure 5:
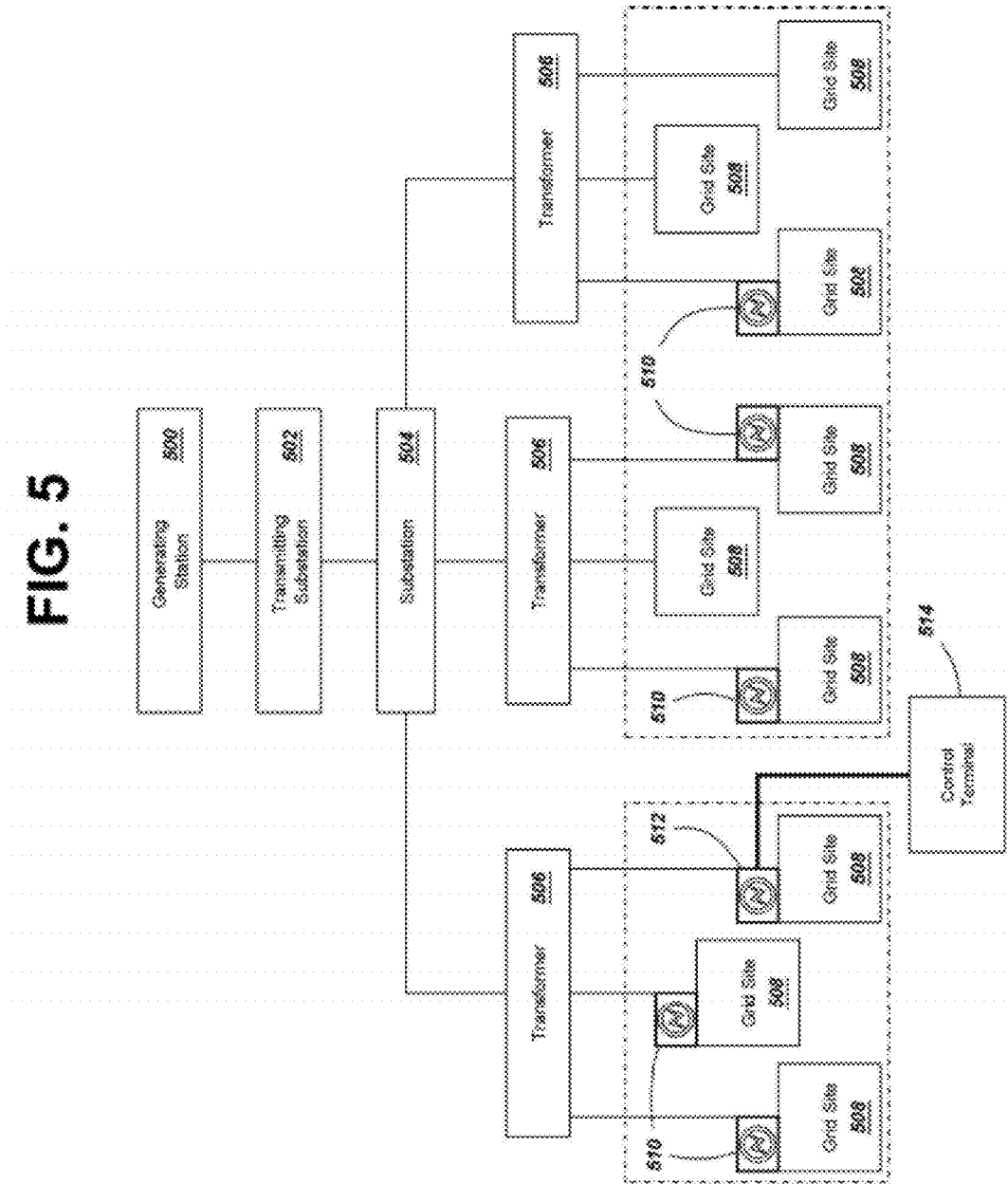
FIG. 5 is a diagram of a distribution grid with installed power management systems, one of which is connected to a control terminal.

FIG. 5 is a diagram of a distribution grid with installed power management systems 510 and 512, one of which is connected to a control terminal 514. A generating station 500, transmitting substation 502, substation 504, and transformers 506 direct generated power to a number of grid sites 508. Some of the grid sites have a power management unit 510 installed, and one power management system 512 is connected to a control terminal 514. This configuration is a basic networked power management system, where power management system 512 and its grid site form a microgrid including a control terminal 514. The control terminal 514 monitors the elements of the power management system 512 and the grid site to which it is connected and acts as a database for that information. It may also act as a point of connection for the power management system 512 to receive commands from a utility grid operator or to contact and interact with other microgrids.

Figure 6:
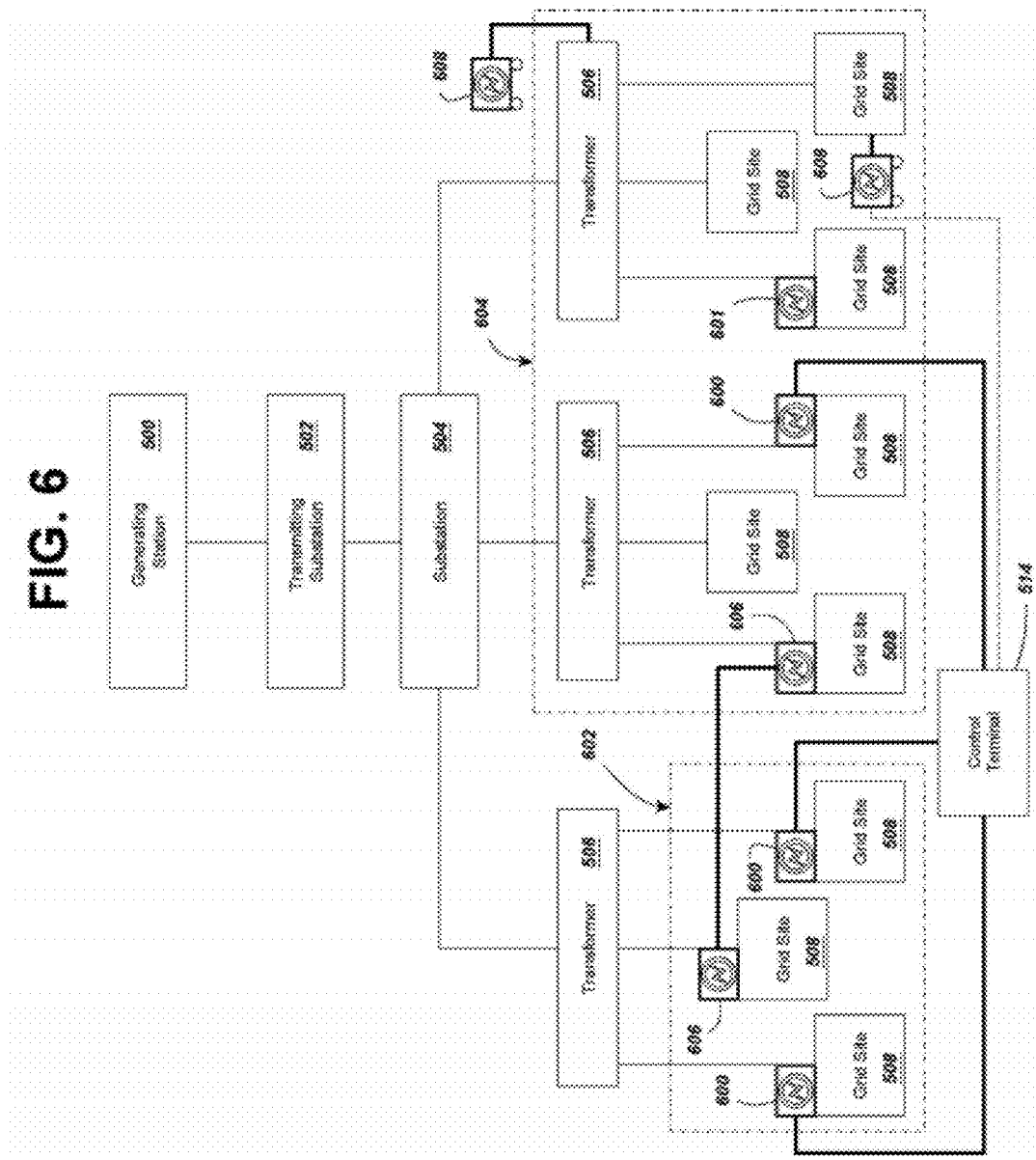
FIG. 6 is a diagram of a distribution grid with installed power management systems, several of which are connected to a control terminal across two zones.

FIG. 6 is a diagram of a distribution grid with installed power management systems 510, 600, and 606, several of which are connected to a control terminal 514 across two zones 602 and 604. The connection of these power management systems 600 to grid sites 508 creates a microgrid in the utility distribution grid. A microgrid may be comprised of energy storage devices, power management controllers, energy generation devices, loads, meters, sensors, control terminals or servers, and other associated electronic devices that may be connected to at least temporarily provide and consume power without connection to a utility distribution grid. Controllers may curtail loads, meaning the consumption of the loads is turned off, set to follow a duty cycle, or turned down on average over time in some other way. Curtailable loads are those loads which the controller may curtail. Preferably, curtailable loads are loads that are not detrimentally affected when they are curtailed, or they are loads that, when curtailed, have a minimal impact on the normal operations of the site over time. For example, a preferable curtailable load may be a freezer, where the freezer may be turned off for a short time to decrease load at the site, but the goods in the freezer are not significantly warmed up during that time and the freezer may turn on again after curtailment to keep the goods from spoiling. The microgrid may be located at a single grid site (e.g., a grid site 508 with power management system 601 connected), across multiple connected grid sites with power management systems (e.g., grid sites 508 with power management systems 606), and/or grid sites across a zone (e.g., zones 602 and 604) or multiple zones with a control terminal 514 acting as a network controller connecting them together. If a microgrid does not have a dedicated control terminal, such as the microgrid of power management systems 606 and their associated grid sites, one or more controllers of the power management systems 606 may be tasked with coordinating the power consumption and charge/discharge of energy storage devices in the microgrid. These power management systems 606 may also have a network connection which may allow microgrid operations to be automated through links to a utility distribution grid control center or microgrid control center.

Mobile power management systems 608 may also be integrated in a zone (e.g., zone 604) to supplement the local generation or energy storage in the zone. Mobile systems 608 may have a wired or wireless link to a control terminal 514, as shown by a dashed line between the two in FIG. 6, or may operate independent of a control terminal. Wireless links may include wireless transmissions such as cellular, wife, radio, RF, infrared transmission, ultraviolet transmission, optical transmission, laser, electromagnetic transmission, wireless broadband, wireless Ethernet, Bluetooth®, Zigbee®, and other common means of transmission of information. With mobile power management systems, energy storage discharge or curtailment capability may be movably provided between zones or between sites within a zone for demand response and load leveling actions that are more flexible and adaptable to the needs of the zone at a given time.

Figure 7:
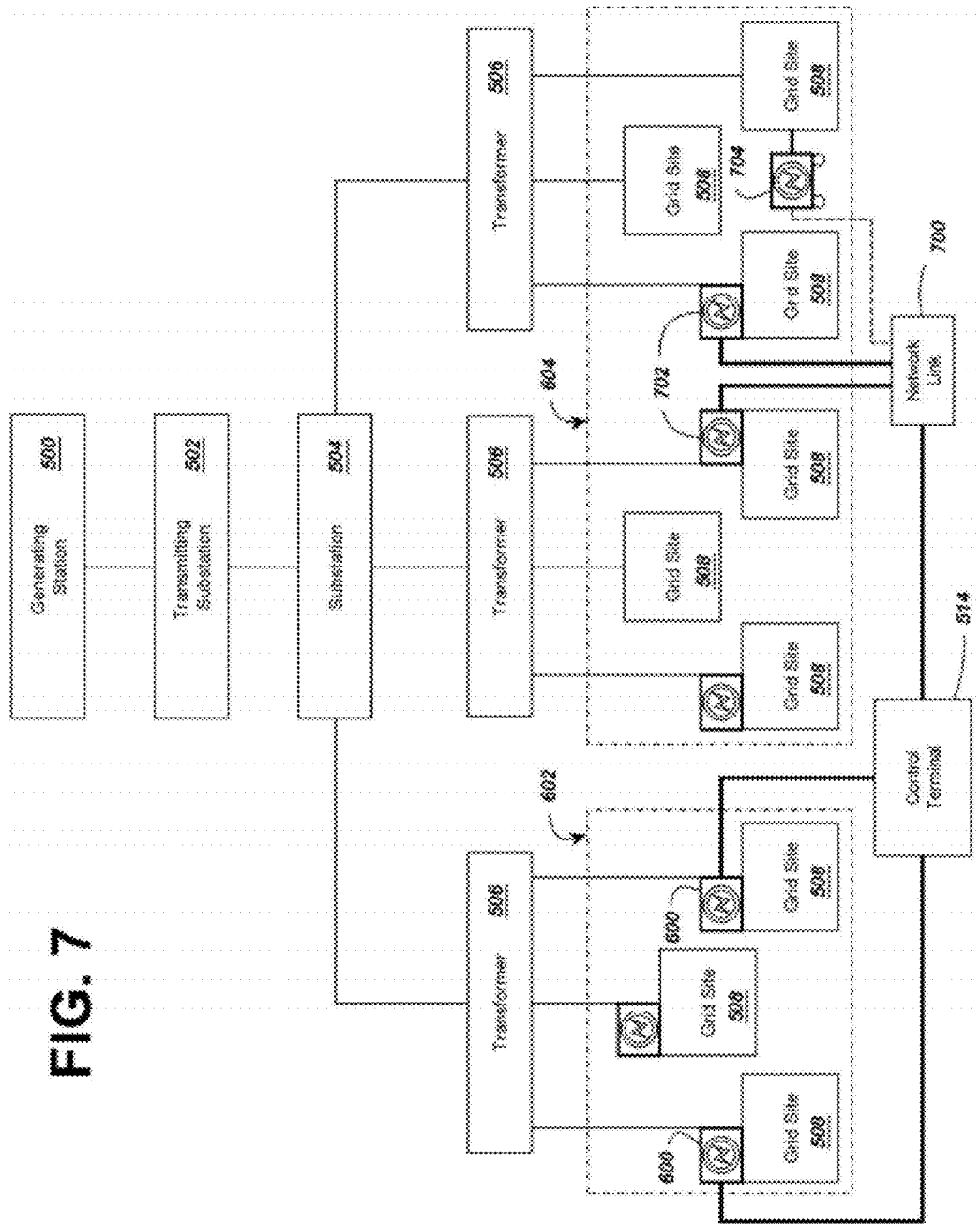
FIG. 7 is a diagram of a distribution grid with installed power management systems, several of which are connected to a control terminal across two zones, and a network link is used to connect some of the power management systems to the control terminal.

FIG. 7 is a diagram of a distribution grid with installed power management systems, several of which are connected to a control terminal across two zones 602 and 604, and a network link 700 is used to connect some of the power management systems 702 to the control terminal 514. A network link 700 may allow power management systems 702 to connect to a control terminal 514 over long distances and may consolidate information from the power management systems 702 to send to the control terminal 514 in a single signal, or it may distribute or redistribute commands from the control terminal 514 to multiple recipients. The network link 700 may include a router, switching device, signal processor, computer, electrical relay, or other structure with input and output capability for transmitting information. The signals sent from the control terminal 514 to the power management systems 702 may be sent by wired or wireless transmission, and a network link 700 may be used to switch the means of transmission after a signal has been sent from the 514 to the network link 700. This may allow the control terminal 514 to contact an increased number of zones (e.g., 602 and 604) without requiring a wired connection to each power management system 702. Mobile power management systems 704 that are connected in remote areas may benefit from network links that relay information over longer distances so that they do not need to have high-power transmitters to communicate with a control terminal or network operations center.

Figure 8:
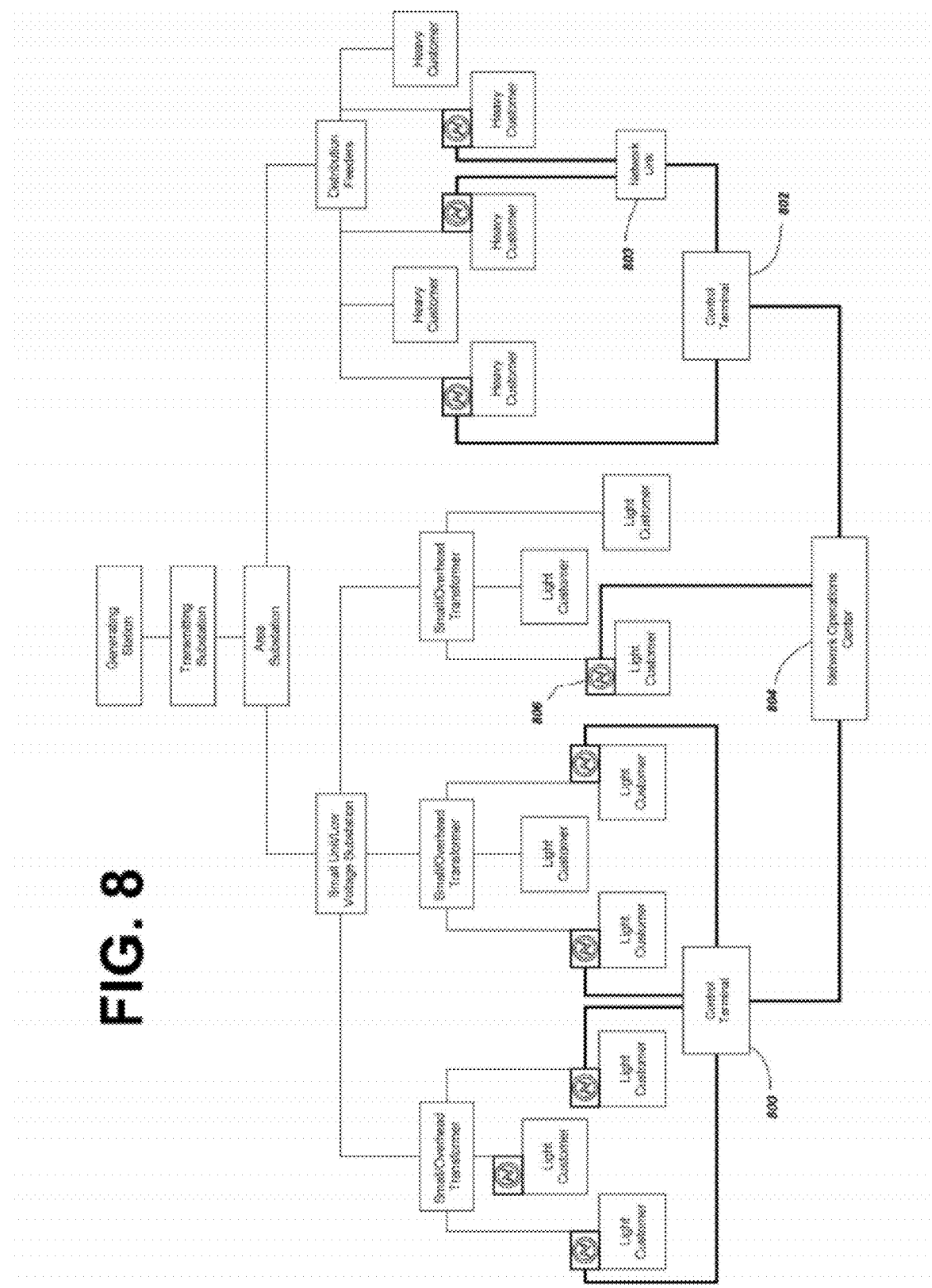
FIG. 8 is a diagram of a distribution grid with installed power management systems, several of which are connected to different control terminals.

FIG. 8 is a diagram of a distribution grid with customer sites having power management systems installed which are connected to multiple control terminals 800 and 802. The means of connecting each control terminal 800 or 802 to power management systems may vary, such as by the presence or absence of network links (such as network link 803) between a control terminal and a power management system. Control terminals 800 and 802 may be linked into a network of control terminals to communicate signals across multiple zones or microgrids, and such a network may have peer-to-peer data exchange between terminals or there may be servers to manage the information at a network operations center 804 connected to the terminals. The network operations center 804 may also serve as a control terminal if it is connected to a power management system such as system 806. Control terminals and network operations centers may be collectively referred to as "network controllers" in this document because they control networks of power management systems installed at grid sites.

Network controllers may operate within one or more than one electric utility distribution grid or zone by monitoring the behavior of power management systems and microgrids and their sub-elements such as photovoltaic (PV) systems, battery energy storage, smart grid loads, and site loads' energy consumption. The network controllers fine tune and update the performance of each power management system or microgrid, including managing upgrades to system software and optimizing energy storage charge and discharge algorithms. They may also interface with an electric utility distributor for the zones they monitor in order to coordinate demand response actions.

Automating Network Management and Demand Response Actions

In some embodiments, the network controllers are a conduit for the utility company to automate demand response in the zones where power management systems and microgrids are installed. For example, a utility operator may send a demand response request to a network controller. The network controller then defines which connected microgrids or power management systems are affected by the demand response request by comparing the locations of the microgrids and power management systems to the utility's jurisdiction, geography, or by actual grid connections to utility assets such as transformers, power meters, and other electronics and instructs the affected systems to offset demand in those areas. Control terminals or system controllers may then define how demand of particular sites or loads will be offset to complete the demand response action. At the control terminal level, demand may be offset by directing system controllers to provide a specified amount or timing of demand response curtailment or mitigation. At the system controller level, demand may be offset by (1) reducing consumption or disconnecting a load from the utility's distribution grid, (2) discharging energy storage into the distribution grid, (3) reallocating consumption of a load to an energy storage device instead of the distribution grid. Communications between the utility and the network controllers may be made via telephone, email, web application, or automated communication between computers or controllers. The nature of demand offsetting may differ at each site affected, such as curtailing the HVAC usage or temperature settings at one site to produce the same curtailment that would be obtained by curtailing electric vehicle chargers and lighting at another site.

In some preferable embodiments, communications between the utility and system controllers or control terminals are automated for at least some demand response actions. For example, in one embodiment a computerized signal is distributed through network lines, wirelessly, using power line communication, or through another similar communication means between the utility provider and a system controller (or control terminal) in a microgrid, and the system controller discharges an energy storage device in response, thereby reducing the load on the utility distribution grid at the microgrid. In embodiments that have automated demand response, when a consumption management signal is distributed to the controllers of the power management systems, the systems may be configured to induce power usage curtailment, load shedding, load shifting to alternative energy sources, discharge an energy storage device, start up or receive energy from an energy generation device, or produce another comparable demand response action in response to receiving the signal. In some cases, sites perform multiple different kinds of demand response actions depending on their capabilities and the nature of the demand response request. A utility provider in this case may distribute a demand response request signal, and then a network operations center, control terminal in a zone, or system controller at a site automatically identifies the actions that the network, zone, or site will take in response to the demand response request in real time. This means that the load curtailment or mitigation that occurs in response to one demand response request may not be the same as the next, when mitigation and curtailment may be more or less advantageous to the utility customers at that time than it was beforehand.

With demand response actions being automated when the utility makes a request for demand response, the utility provider gains more reliable demand response results, makes demand response participation payments more cost-effective, and has reduced labor requirements in sending out and monitoring demand response actions. The utility customer or system controller operator benefits by requiring less labor in responding to demand response requests from the provider and predictable results when a demand response request is received. The customer may also benefit by having a lesser impact on his or her activities if the automated demand response request action taken by the local system controller uses a prioritization algorithm of curtailment and mitigation that takes into account the effect that a particular action would cause on the customer's operations.

Some power management systems and control terminals are equipped with utility grid status monitoring devices. Such devices may monitor the status of the grid, such as line voltage, current, or other measurables, and they may monitor the status of loads and assets, such as the consumption of loads at a site or in a zone, the state of charge or available energy available from energy storage systems or generation devices distributed at sites or in the zone, the location of mobile power management systems, and other information useful in tracking power management operations in the utility distribution grid.

In some embodiments, the system controller is configured to automatically report to the utility provider when a demand response event occurs, such as at the time a demand response request is sent out, or after the system controller completes a demand response request. The automatic report may include information about the status of the demand response action such as the amount of consumption curtailed by a microgrid or specific power management systems, the status of distributed generation assets monitored by the system controllers, consumption rates of customer sites, estimated results of further demand response actions, and other relevant factors that may be used by the utility in tracking the success, results, and future potential of demand response requests. The automated reporting embodiments are preferably combined with automated demand response performing systems. This provides the utility provider with reliable expectations of demand response results and reporting of the results in real-time or when the demand response concludes for further analysis and diagnosis in future demand response events.

In order to monitor power management systems and microgrids, network controllers may receive up-to-date data from each power management system or microgrid on a consistent basis, for example, every five seconds, ten seconds, thirty seconds, five minutes, fifteen minutes, hour, twelve hours, day, other time period, or divisions thereof. Measurements may also be taken on an on-demand or as-needed basis in some embodiments. The data gathered may include temperature (of the devices, of their surroundings, or atmospheric), voltage, current, energy storage state of charge, and other physical and electrical characteristics, load management status, curtailment capacity and availability, energy storage or generation capacity and availability, etc., and it may be stored in a data storage means such as a database. The database may then be accessed for processing and analysis and/or may be presented through a web application to users along with computer-calculated determinations regarding the overall health and abilities of the systems or microgrids monitored. For example, an algorithm may be implemented where periods of large power consumption are measured and compared to the utilization of PV and energy storage modules to counteract that demand. Over time, this algorithm may determine that the energy storage discharge profile of a particular power management system may not be aggressive enough to offset a demand spike, and the network controller flags it for an energy discharge algorithm update. The network controller then sends new discharge algorithm parameters to the outdated microgrid through a transmission and/or network link so that the microgrid will mitigate demand spikes more efficiently. This monitoring and updating of control parameters and algorithms may be done autonomously when load control and demand response indicators are reached and trigger new control parameters or alternative algorithms.

Distributed or Aggregated Lesser Demand Response Requirements

Traditionally, demand response program participation is limited to those consumers in the utility grid that could make a significant impact on the demand by performing demand response actions, and a minimum demand response participation threshold of the utility provider is set, such as 50 kilowatts. If a customer could not produce the full 50 kilowatts of demand response curtailment or mitigation at one site, it would not be allowed to participate in the program. This was a problem for smaller consumers, because producing that much curtailment at once would prohibit them from conducting normal business, so the demand response program participants would almost always be large-scale consumers. The smaller customers could feasibly produce smaller demand responses, such as 5 to 10 kilowatts each, but the utility provider would not be interested in such small responses since participation in demand response is difficult to track and implement, and greater levels of curtailment are typically preferred. But by assigning a demand response requirement to multiple sites as a whole, fulfilling the requirement through smaller demand response actions that are distributed across the sites, or by making smaller demand response assignments to individual smaller customers easier, the utility provider receives the desired amount of demand response and the customers benefit from less negative impact on their business and other benefits of demand response programs, such as utility credits or rebates for their participation. Thus, in one aspect of the invention, a large demand response requirement is provided to a control terminal networked with multiple sites, and the large demand response requirement is fulfilled by multiple sites contributing a small amount of demand response. In another aspect of the invention, the utility provider directly requests small demand response actions from demand-response-automated power management systems at many customers' sites, such as through a control terminal at the utility provider site, instead of sending a single large demand response request to an aggregating control terminal to distribute and fulfill the request from multiple sites.

In some embodiments, the "demand response participation threshold" refers to the minimum amount of demand response curtailment and/or mitigation that must be produced by a participant of a demand response program under a request sent directly from the utility provider that is not automatically fulfilled by an automated power management system. For example, if the demand response threshold for a utility is 45 kilowatts of curtailment, then a customer who qualifies for participation in the utility's demand response program must be able to produce at least 45 kilowatts of curtailment on request without the curtailment being produced automatically by a power management system when the power management system receives a request for demand response. Demand response participation by a site that is less than the demand response threshold is enabled by embodiments of the invention where the participation is (a)

aggregated by a control terminal to at least meet the minimum threshold before participation is allowed, or (b) directly requested from the utility to an automated demand response power management system. In some embodiments of case (a), the control terminal is operated by the utility provider, but it may also be operated by other entities. In effect, this may mean that the utility provider sets a minimum demand response threshold for requests sent to non-automated systems and a minimum demand response threshold for requests sent to automated systems, where the threshold for automated systems is less than the non-automated threshold.

Demand response capability provided by embodiments of the invention allows demand response programs to be expanded to utility customers that consume energy on a smaller scale per site than traditional demand response program participants. This may be done through aggregation of demand response actions of multiple small facilities in order to match traditional demand response levels. As part of some embodiments, a method of distribution of lesser demand response requirements to multiple small facilities is performed to fulfill larger demand response requirements that are made up of a number of the lesser demand response requirements. When the consumption and demand response actions of multiple small facilities are pooled, the aggregate effects can be significant, and may therefore qualify to meet minimum demand response participation thresholds, especially when loads at those sites that are traditionally considered to be non-curtailable are made curtailable by power management system controllers and energy storage and generation assets. For example, in some embodiments, power management systems of all locations of a convenience store chain in a zone are linked in a microgrid network, and the control terminal of that microgrid is able to distribute lesser demand response requirements to the demand response assets of those locations and provide significant demand response effects for the utility provider by dividing a larger requirement into smaller requirements that the demand response assets can complete satisfactorily. As an added benefit, the customer or utility provider may receive reports on the demand response produced by the control terminal or power management systems, giving accountability to the process that is difficult to obtain when the number of participants in the demand response program increases.

The control terminal may also be able to assign different requirements of demand response to the different locations or to assign different kinds of demand response actions to different locations, if desired. A method that may be followed may include (1) receiving a demand response requirement for a number of sites as a whole, such as a 50-kilowatt demand response curtailment request from a utility provider, (2) dividing the demand response requirement into lesser demand response requirements, such as two 20-kilowatt requirements and two 5-kilowatt requirements or five requirements for 20% of the demand response requirement for the sites as a whole, (3) distributing the lesser demand response requirements to the networked power management systems of the sites in such a manner that each site receives one or more of the lesser demand response requirements, and (4) fulfilling the demand response requirement for the sites as a whole by fulfilling each of the lesser demand response requirements through the use of the networked power management systems of the sites to which the lesser demand response requirements were distributed.

In embodiments of an aggregation or distribution system or method, the control terminal may request equal or disparate levels of curtailment and mitigation from each connected power management system, proportional curtailment and mitigation from each connected power management system, a prioritized amount of curtailment and mitigation based on the priority of the loads and energy storage and generation connected to each power management system, different timing requirements for different devices or locations, or other comparable methods that may be apparent to one having skill in the art. For example, a control terminal could request 5-10 kW (or 5-20% of the total) from each site, with precise values for each site depending on the priority of the loads at each site, such as a hospital or other emergency service being excluded from having to participate outside of dire demand response circumstances, or a ranking system where the priority of individual sites depends on how recently that site has participated in a demand response event or it depends on the amount of demand response benefits that each site gets from the utility provider, among other possibilities. A control terminal could also request that certain sites provide curtailment for half of the demand response, and that certain sites provide curtailment for the other half. The system controllers in each power management system networked to the control terminal may then individually determine how and with what assets the required demand curtailment will be produced. Thus, there is intelligent allocation of demand response requirements at each level of the system, allowing flexibility in the means by which the demand response action takes place, which benefits the customers, but not allowing flexibility in the end result for the utility provider.

Figure 9:
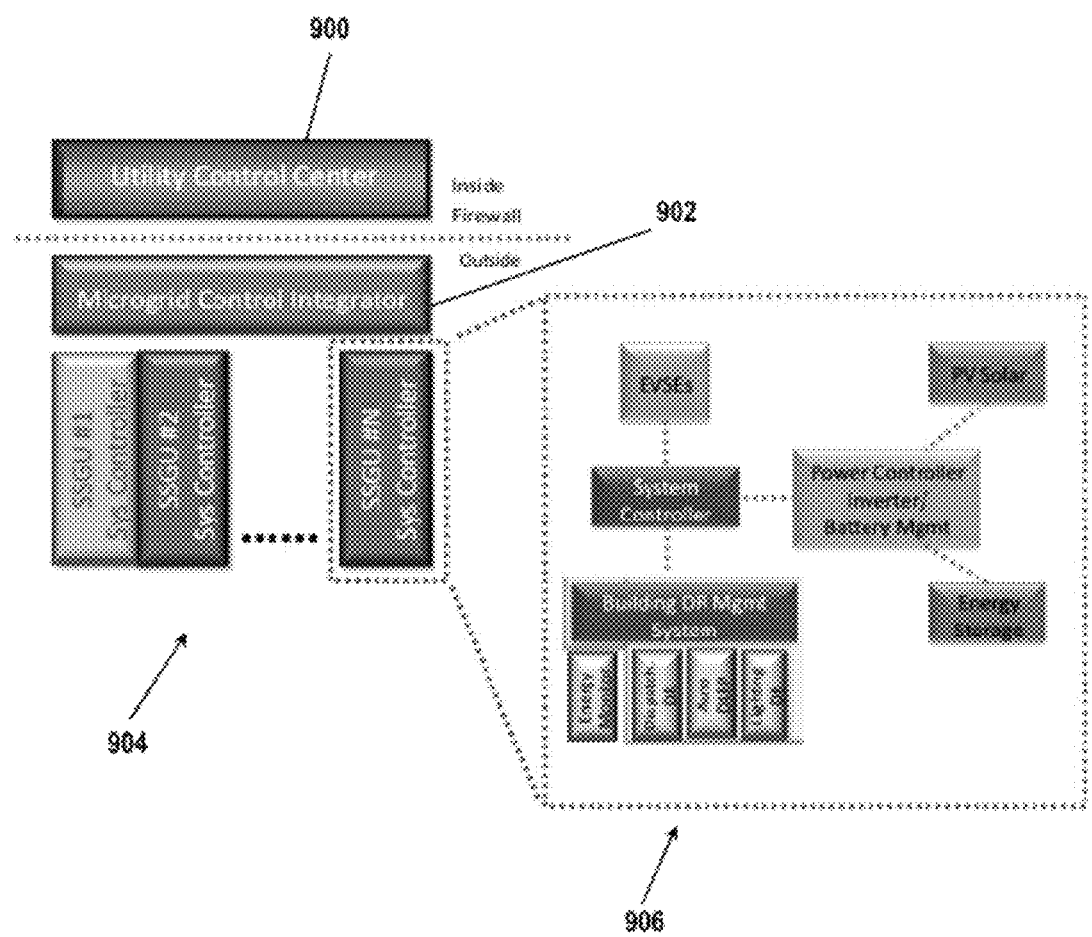

FIG. 9 shows a building demand response management system aspect of the invention, wherein a utility control center 900 manages demand response through a microgrid control integrator 902. The integrator 902 distributes or aggregates demand response actions performed by multiple system controllers 904 (with indicating numbers shown ranging from 1 to N) which would be installed at various sites within the microgrid of the integrator. The system controllers 904 are linked to various demand response devices and loads at their respective sites, such as EVSEs, building demand response management systems, power controllers for inverter or battery management, etc., as indicated in box 906. In a system such as this, when a demand response request is provided by the utility control center 900 to the microgrid control integrator 902, the integrator 902 assigns demand response requirements to the system controllers 904 in the microgrid, which in turn automatically produce demand response through the systems to which they are connected at the sites 906. The specific activities of each system controller or site are opaque to the utility control center 900, so the control integrator 902 appears to be a single "customer" or participant in the demand response program even though a large number of sites may in fact be the customers taking action in response to a demand response request.

Miscellaneous Definitions and Scope Information

Generally speaking, as used herein a "power converter" may refer to a generic electric power converter, inverter, transformer, regulator, voltage stabilizer, rectifier, power supply unit, or other conversion device or combination of these devices that may be used to convert the voltage, frequency, and/or phase of an electrical power source or signal from one form into another form.

As used herein, an "energy storage device" ("ESD") or "energy storage system" ("ESS") is a means for storing energy such as, for example, electrochemical batteries, compressed gas storage, pumped hydro storage, flywheel energy storage, capacitive energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices may be comprised of small or large numbers of cells, capacities, voltages, amperages, and other battery properties. They may be configured in unitary or modular designs and may follow standardized guidelines or customized specifications.

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to operate the heating of the ESD and historical or forecasted temperature data for the ESD or its surroundings.

In some embodiments the energy storage devices may be integrated with or connected to power management systems, such as those used for peak mitigation, load leveling, or backup or uninterruptible power supplies, since they may conveniently provide the electronic equipment needed to connect an energy storage device to the distribution grid. However, energy storage devices that serve other purposes may be utilized when the necessary connecting equipment is used. Such connecting equipment may comprise power converters for changing voltage signals, inverters for changing AC signals to DC signals (or vice versa), controllers for directing the operation of the power converters, signal conditioning electronics such as stabilizing capacitors, cables, connectors, and other items required to efficiently and safely bring the stored energy to the distribution grid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or component of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A system of networked power management systems for load management of an electrical utility distribution grid, the system comprising:
   a control terminal for a zone of an electrical utility distribution grid, the zone comprising a plurality of separate sites of a plurality of individual electrical utility customers, the plurality of separate sites of the plurality of individual electrical utility customers being connected to the electrical utility distribution grid, the plurality of separate sites being connected to each other in a microgrid;
   a plurality of power management systems, wherein a power management system is located at each of the plurality of separate sites of the plurality of individual electrical utility customers in the microgrid, each of the plurality of power management systems comprising:
      a network connection to the control terminal whereby the power management system is configured to receive parameters from the control terminal, wherein the parameters define target demand response requirements for a power management system of the plurality of power management systems, and
      a system controller configured to manage the consumption of electricity from the electrical utility distribution grid by at least one load under the parameters received from the control terminal, the at least one load being curtailable, the system controller being configured to define a curtailment response for the at least one load to meet the target demand response requirements of the parameters, the curtailment response being based on comparing consumption of the at least one load to a moving average of the consumption of the at least one load.

2. The system of claim 1, wherein the definition and execution of the curtailment response is configured to be automated when said parameters are received.

3. The system of claim 2, wherein said target demand response requirements are less than a demand response participation threshold for utility customers in the utility distribution grid having demand response capabilities that are not automated.

4. The system of claim 1, further comprising:
   a network operations center having a network connection to said control terminal;
   wherein said control terminal is configured to receive a target demand response instruction for the zone from the network operations center through the network connection of the network operations center; and
   wherein said control terminal divides the target demand response instruction for said zone into demand response parameters specific to each of the plurality of power management system in said zone.

5. The system of claim 1, at least one of the plurality of power management systems further comprising a mitigation system, wherein said system controller is configured to mitigate a load by providing energy from the mitigation system under said parameters received from the control terminal.

6. The system of claim 5, wherein said parameters define target demand response requirements for a power management system of the plurality of power management systems, and each said system controller is configured to define the mitigation of said load using said mitigation system to meet the parameters.

7. The system of claim 6, wherein the definition and execution of said mitigation of said load is configured to be automated when said parameters are received.

8. The system of claim 7, wherein said target demand response requirements are less than a demand response participation threshold for utility customers in the utility distribution grid having demand response capabilities that are not automated.

9. The system of claim 1, wherein at least one of the plurality of power management systems is a movable power management system connectable to and disconnectable from one or more sites in said zone.

10. The system of claim 9, wherein said parameters define a site at which site said movable power management system is to be connected for curtailment or mitigation.

11. The system of claim 9, wherein said parameters define a zone at which zone said movable power management system is to be connected for curtailment or mitigation.

12. The system of claim 1, said control terminal further comprising a status monitoring device configured to monitor the utility distribution grid in the zone, and at least one said power management system further comprising a sensor configured to monitor the utility distribution grid status, wherein the status monitoring device comprises the sensor.

13. The method of claim 1, wherein the control terminal divides a total demand response requirement into lesser demand response requirements, the lesser demand response requirements being distributed to the plurality of power management systems.

14. A system of networked power management systems for load management of an electrical utility distribution grid, the system comprising:
   a control terminal for a zone of an electrical utility distribution grid, the zone comprising a plurality of sub-zones, each sub-zone comprising a plurality of separate locations of individual electrical utility customers, the plurality of separate locations of individual electrical utility customers being connected to the electrical utility distribution grid, the plurality of separate locations being connected to each other in microgrids;
   a plurality of power management systems, wherein each of the plurality of separate locations of a plurality of individual electrical utility customers in each sub-zone in the microgrids comprises at least one of the plurality of power management systems, at least one of the plurality of power management systems being a mobile platform configured to be moved by a vehicle between sub-zones or between sites within a single sub-zone and to connect to different locations of individual electrical utility customers, each of the plurality of power management systems comprising:
      a network connection to the control terminal whereby the power management system is configured to receive parameters from the control terminal, the parameters defining target demand response requirements for a power management system of the plurality of power management systems, and a system controller configured to manage the consumption of at least one load under the parameters received from the control terminal, the at least one load being curtailable, the system controller being configured to define a curtailment response for the at least one load to meet the target demand response requirements of the parameters; and wherein parameters received from the control terminal by power management systems located in a first sub-zone of the plurality of sub-zones differ from parameters received by power management systems located in a second sub-zone of the plurality of sub-zones.

15. The system of claim 14, further comprising:
a network operations center having a network connection to said control terminal;
wherein said control terminal is configured to receive a target demand response instruction for the zone from the network operations center through the network connection to the network operations center; and
wherein said control terminal divides the target demand response instruction into demand response parameters specific to each of the plurality of sub-zones.

16. The system of claim 14, at least one of said power management systems further comprising a mitigation system, wherein said system controller is configured to mitigate a load by providing energy from the mitigation system under said parameters received from said control terminal.

17. The system of claim 16, wherein said parameters define target demand response requirements for each of the plurality of sub-zones, and each said system controller is configured to manage the consumption of said loads using said mitigation system to meet the parameters received in the sub-zone in which system controller is configured.

18. The system of claim 14, said control terminal further comprising a status monitoring means configured to monitor the utility distribution grid status in said second sub-zone, and said parameters received in said first sub-zone are based on the utility distribution grid status of said second sub-zone.

19. A method of distributed utility demand response using networked power management systems connected to a plurality of separate electrical utility customer sites in a utility distribution grid, the networked power management systems each comprising a system controller configured to execute demand response requirements received through a network connection by managing the consumption of one or more loads in microgrids, the method comprising:
receiving a total demand response requirement;
dividing the total demand response requirement into lesser demand response requirements;
distributing the lesser demand response requirements to a plurality of separate electrical utility customer sites of a plurality of separate electrical utility customers by transmission of the lesser demand response requirements to the networked power management systems of the plurality of separate electrical utility customer sites, the plurality of separate electrical utility customer sites being connected to each other in microgrids, wherein each separate electrical utility customer site receives one of the lesser demand response requirements; and
fulfilling the total demand response requirement by fulfilling each of the lesser demand response requirements through the use of the networked power management systems of the separate electrical utility customer sites formed in microgrids to which the lesser demand response requirements are distributed by curtailing at least one curtailable load of the separate electrical utility customer sites.

20. The method of claim 19, wherein each of the lesser demand response requirements is less than a demand response participation threshold of a utility provider of the utility distribution grid, and wherein the total demand response requirement is greater than or equal to the demand response participation threshold.

21. The method of claim 19, wherein the fulfillment of the lesser demand response requirements is automated by the system controllers of the networked power management systems when the lesser demand response requirements are received through the network connections.

22. The method of claim 21, wherein each of the lesser demand response requirements is less than a demand response participation threshold for utility customers of the utility distribution grid that do not automate demand response actions.

23. The method of claim 19, wherein at least two of the lesser demand response requirements have different power level or timing requirements.

* * * * *